United States Patent
Schweid et al.

(10) Patent No.: US 7,085,012 B2
(45) Date of Patent: Aug. 1, 2006

(54) METHOD FOR AN IMAGE FORMING DEVICE TO PROCESS A MEDIA, AND AN IMAGE FORMING DEVICE ARRANGED IN ACCORDANCE WITH THE SAME METHOD

(75) Inventors: Stuart Alan Schweid, Pittsford, NY (US); Roger L. Triplett, Penfield, NY (US); Xing Li, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1008 days.

(21) Appl. No.: 10/184,228

(22) Filed: Jun. 27, 2002

(65) Prior Publication Data

US 2004/0001646 A1    Jan. 1, 2004

(51) Int. Cl.
  *H04N 1/047* (2006.01)
  *H04N 1/387* (2006.01)
  *G06K 9/32* (2006.01)
  *G06K 9/80* (2006.01)
  *G06T 3/60* (2006.01)
  *G06T 7/60* (2006.01)

(52) U.S. Cl. ............ 358/2.1; 358/3.26; 358/488; 382/289; 382/296

(58) Field of Classification Search ........ 382/286–287, 382/289–296, 181, 190, 282–283; 358/2.1, 358/3.26, 451–462, 488
See application file for complete search history.

(56) References Cited

U.S. PATENT DOCUMENTS

| | | | | |
|---|---|---|---|---|
| 5,528,387 | A | 6/1996 | Kelly et al. | 358/488 |
| 5,818,976 | A | 10/1998 | Pasco et al. | 382/289 |
| 5,857,784 | A * | 1/1999 | Allen | 400/74 |
| 5,912,448 | A | 6/1999 | Sevier et al. | 235/454 |
| 6,022,154 | A * | 2/2000 | Allen | 400/76 |
| 6,078,051 | A | 6/2000 | Banton et al. | 250/341.1 |
| 6,122,393 | A | 9/2000 | Schweid et al. | 382/112 |
| 6,198,835 | B1 | 3/2001 | Banton et al. | 382/112 |
| 6,246,781 | B1 | 6/2001 | Schweid et al. | 382/112 |
| 6,252,680 | B1 | 6/2001 | Schweid et al. | 358/463 |
| 6,310,984 | B1 | 10/2001 | Sansom-Wai et al. | 382/289 |
| 6,718,071 | B1 * | 4/2004 | Yoshida et al. | 382/289 |

* cited by examiner

*Primary Examiner*—Scott A. Rogers
(74) *Attorney, Agent, or Firm*—Wayne J. Egan (57) ABSTRACT

An image forming device includes a backing and is arranged for a media to be positioned against the backing. The backing includes an embedded backing pattern. The media is skewed with respect to the scanning, thus defining a media skew. The media and the backing are scanned to form a pixel pattern. For each pixel, an included pattern recognition algorithm determines when the pixel represents the backing. When the pixel represents the backing, it is replaced with a replacement backing symbol, otherwise it is replaced with a replacement media symbol. The pixel determining and symbol replacing process is continued for remaining pattern pixels to form a replacement symbol pattern comprised of the replacement backing symbols and the replacement media symbols. The media is then processed based on the replacement symbol pattern, the processing including detecting the media skew, registering the media, or both.

30 Claims, 4 Drawing Sheets

METHOD FOR AN IMAGE FORMING DEVICE TO PROCESS A MEDIA, AND AN IMAGE FORMING DEVICE ARRANGED IN ACCORDANCE WITH THE SAME METHOD

INCORPORATION BY REFERENCE OF OTHER U.S. PATENTS

The disclosures of the following U.S. patents are hereby incorporated by reference, verbatim, and with the same effect as though the same disclosures were fully and completely set forth herein: Nancy R. Kelley et al., U.S. Pat. No. 5,528,387; Richard Clark Pasco et al., U.S. Pat. No. 5,818,976; Richard G. Sevier et al., U.S. Pat. No. 5,912,448; Martin E. Banton and Stuart A. Schweid, the same co-inventor in the present application, et al., U.S. Pat. No. 6,078,051; Stuart A. Schweid, the same co-inventor, et al., U.S. Pat. No. 6,122,393; Martin E. Banton and Stuart A. Schweid, the same co-inventor, et al., U.S. Pat. No. 6,198,835; Stuart A. Schweid, the same co-inventor, et al., U.S. Pat. No. 6,246,781; Stuart A. Schweid, the same co-inventor, et al., U.S. Pat. No. 6,252,680; and Cindy Y. Sansom-Wai et al., U.S. Pat. No. 6,310,984.

FIELD OF THE INVENTION

This application relates to image forming devices.

BACKGROUND OF THE INVENTION

Many page de-skew algorithms depend on finding the edge of the document against the backing of the scanner. This method has some limitations. First, it does not work very well where the input media contains image all the way to the edge (e.g., photographs). Second, it does not work very well when the media itself is dark (e.g., dark-colored paper).

Image processing algorithms exist for determining the skew and registration of a scanned input image. Some of these systems use image skew detection. The image content is used to determine the skew of the input document. Simpler algorithms employ page or media skew detection, wherein the paper (or other media) edge is detected and used to determine the skew and media corners.

From an image processing perspective, an attribute of the paper is used to distinguish the paper from the backing of the scanner. The attribute used is the gray value of the paper. This is convenient in systems where the backing of the scanner is black, and thus easily distinguished. In such a system, a black-to-white transition in the captured image corresponds to the backing-to-paper transition, i.e., the paper edge.

This method works fine for images where the paper is white and there is no image near the border. Problems arise, however, when the paper is either colored or when the image goes up the border such as, for example, in a photograph.

SUMMARY OF THE INVENTION

In one aspect of the invention there is described, in an image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, a method of processing the media comprising steps of scan the media and the backing to form an image information; based on the image information, form a pixel pattern; based on the pattern recognition algorithm, for each pixel in the pixel pattern, determine when the pixel represents the backing; when the pattern recognition algorithm determines that the pixel represents the backing, replace the pixel with a replacement backing symbol, otherwise replace the pixel with a replacement media symbol; based on the replacement backing symbols and the replacement media symbols, form a replacement symbol pattern; and process the media based on the replacement symbol pattern.

In another aspect of the invention, there is described an image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, the image forming device arranged for processing the media in accordance with a method comprising steps of scan the media and the backing to form an image information; based on the image information, form a pixel pattern; based on the pattern recognition algorithm, for each pixel in the pixel pattern, determine when the pixel represents the backing; when the pattern recognition algorithm determines that the pixel represents the backing, replace the pixel with a replacement backing symbol, otherwise replace the pixel with a replacement media symbol; based on the replacement backing symbols and the replacement media symbols, form a replacement symbol pattern; and process the media based on the replacement symbol pattern.

In still another aspect of the invention, there is described an image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, a skew detection algorithm and a media registering algorithm, the image forming device arranged for processing the media in accordance with a method comprising steps of scan the media and the backing to form an image information; based on the image information, form a pixel pattern; based on the pattern recognition algorithm, for each pixel in the pixel pattern, determine when the pixel represents the backing; when the pattern recognition algorithm determines that the pixel represents the backing, replace the pixel with a replacement backing symbol, otherwise replace the pixel with a replacement media symbol; based on the replacement backing symbols and the replacement media symbols, form a replacement symbol pattern; process the media based on the replacement symbol pattern to form a symbol-based registration and deskew result and determine when the symbol-based registration and deskew result is valid; process the media based on the video gray level of the scanned image to form a video-based registration and deskew result and determine when the video-based registration and deskew result is valid; if only the symbol-based registration and deskew result is valid, use only the symbol-based registration and deskew result; if only the video-based registration and deskew result is valid, use only the video-based registration and deskew result; and if the symbol-based registration and deskew result is valid and the video-based registration and deskew result is valid, average or otherwise combine both the symbol-based registration and deskew result and the video-based registration and deskew result.

BRIEF DESCRIPTION OF THE SEVERAL VIEWS OF THE DRAWING

FIG. 1 further depicts the image forming device 100 scanning the media 1 and the backing 5 by means of an included illumination source 3, sensor 4 and processor 10.

FIG. 2 depicts a fastscan direction 21 and slowscan direction 22. FIG. 2 further depicts the media 1 forming a skew angle or media skew 7 with respect to the slowscan direction 22.

DETAILED DESCRIPTION OF THE INVENTION

Briefly, in accordance with the present invention, an image forming device includes a backing and is arranged for a media to be positioned against the backing. The backing includes an embedded backing pattern. The media is skewed with respect to the scanning, thus defining a media skew. The media and the backing are scanned to form a pixel pattern. For each pixel, an included pattern recognition algorithm determines when the pixel represents the backing. When the pixel represents the backing, it is replaced with a replacement backing symbol, otherwise it is replaced with a replacement media symbol. The pixel determining and symbol replacing process is continued for remaining pattern pixels to form a replacement symbol pattern comprised of the replacement backing symbols and the replacement media symbols. The media is then processed based on the replacement symbol pattern, the processing including detecting the media skew, registering the media, or both.

Figure 1:
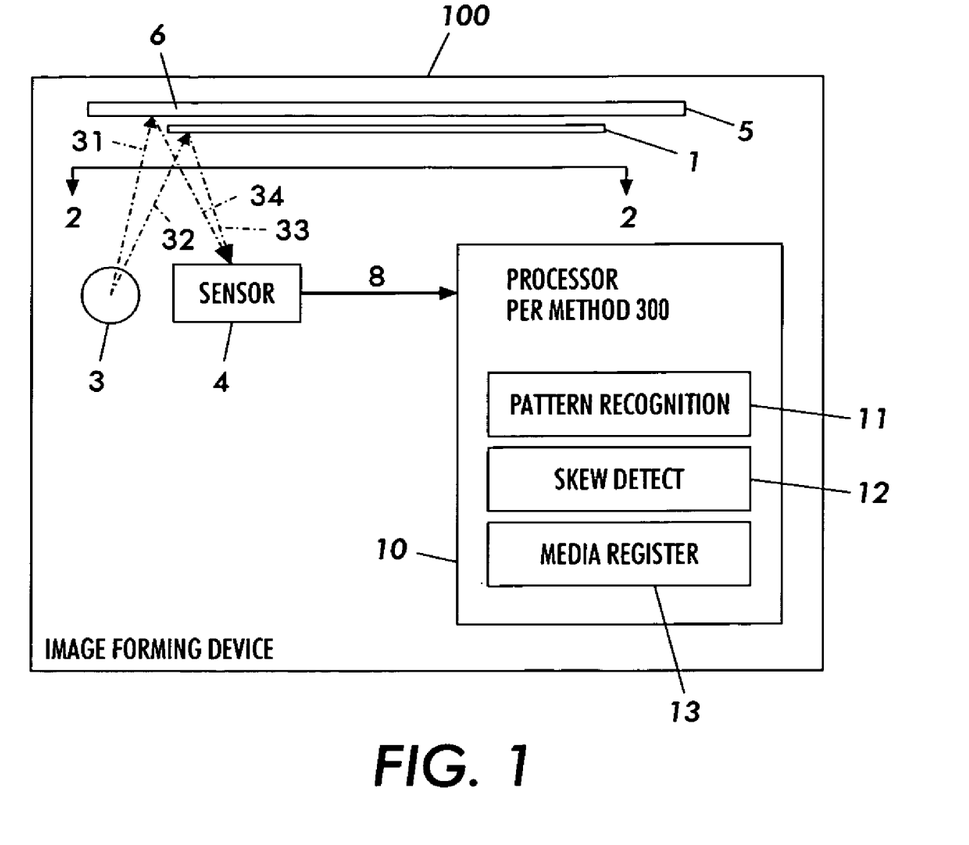
FIG. 1 is a block diagram of an image forming device 100 that includes a backing 5 with a backing pattern 6 embedded therein, the image forming device 100 being arranged for a media 1 to be positioned against the backing 5, wherein the media 1 and the backing 5 are depicted in profile view.

Referring now to FIG. 1 there is shown an image forming device 100 that includes a backing 5 with a backing pattern 6 embedded therein. In one embodiment, the embedded backing pattern 6 is substantially equivalent to the embedded pattern 21 that is described in any of the U.S. Pat. Nos. 6,078,051; 6,122,393; 6,198,835; 6,246,781 and 6,252,680. In U.S. Pat. No. 6,246,781, for example, the embedded pattern 21 is generally described in col. 6, lines 25–60.

In one embodiment, the image forming device 100 is arranged to perform at least one function of a printing function, a copying function and a faxing function.

As shown, the image forming device 100 is arranged for a media 1 to be positioned against the backing 5.

In one embodiment, the media 1 comprises a conventional sheet of paper.

As depicted in FIG. 1, the image forming device 100 is arranged to scan the media 1 and the backing 5 in both a fastscan direction and a slowscan direction to form a pixel pattern. The terms "fastscan direction" and "slowscan direction" are common and well-known as described, for example, in col. 5, lines 25–35 of U.S. Pat. No. 6,252,680. The fastscan direction and the slowscan directions are described in greater detail in connection with FIG. 2 below.

Still referring to FIG. 1, the scanning is accomplished by any conventional means. For example, as depicted in FIG. 1, an illumination source 3 emits illuminating light energy signals 31–32 which impinge the media 1 and backing 5, thus generating corresponding reflecting light energy signals 33–34 which are received by a sensor 4. In turn, the sensor 4 converts the received light energy signals 33–34 into an electronic scanned image information, generally depicted by the reference number 8. The electronic scanned image information 8 is then input and processed by a processor 10. Based on the input image information 8, the processor 10, in turn, is arranged for processing the media 1 in accordance with a process or method 300 that is described in greater detail in connection with FIG. 3 below.

In one embodiment, the sensor 4 comprises a charged couple device (CCD), a full width array sensor (FWA), or other photoelectric device which can operate in a black/white mode or a color mode.

As shown in FIG. 1, the processor 10 comprises a pattern recognition algorithm 11. In one embodiment, the pattern recognition algorithm 11 is substantially equivalent to the pattern recognition algorithm described in any of the U.S. Pat. Nos. 6,078,051; 6,122,393; 6,198,835; 6,246,781 and 6,252,680. For example, in U.S. Pat. No. 6,246,781 the pattern recognition algorithm is generally described in the written description from col. 6, line 61 to col. 8, line 5 and depicted in the drawing FIGS. 10–13.

Still referring to FIG. 1, the processor 10 further comprises a skew detection algorithm 12, a media registering algorithm 13, or both.

In one embodiment, the skew detection algorithm 12 is based on the skew detection algorithm that is described in "Method and apparatus for document skew and size/shape detection", by Richard Clark Pasco et al., U.S. Pat. No. 5,818,976, issued 6 Oct. 1998.

In another embodiment, the skew detection algorithm 12 is based on the skew detection algorithm that is described in "Method and apparatus for detecting paper skew in image and document scanning devices", by Richard G. Sevier et al., U.S. Pat. No. 5,912,448, issued 15 Jun. 1999.

In still another embodiment, the skew detection algorithm 12 is based on the skew detection algorithm that is described in "Image processing system with image cropping and skew correction", by Cindy Y. Sansom-Wai et al., U.S. Pat. No. 6,310,984, issued 30 Oct. 2001.

In one embodiment, the media registering algorithm 13 is based on the media registering algorithm that is described in "Electronic image registration for a scanner", by Nancy R. Kelly et al., U.S. Pat. No. 5,528,387, issued 18 Jun. 1996.

Figure 2:
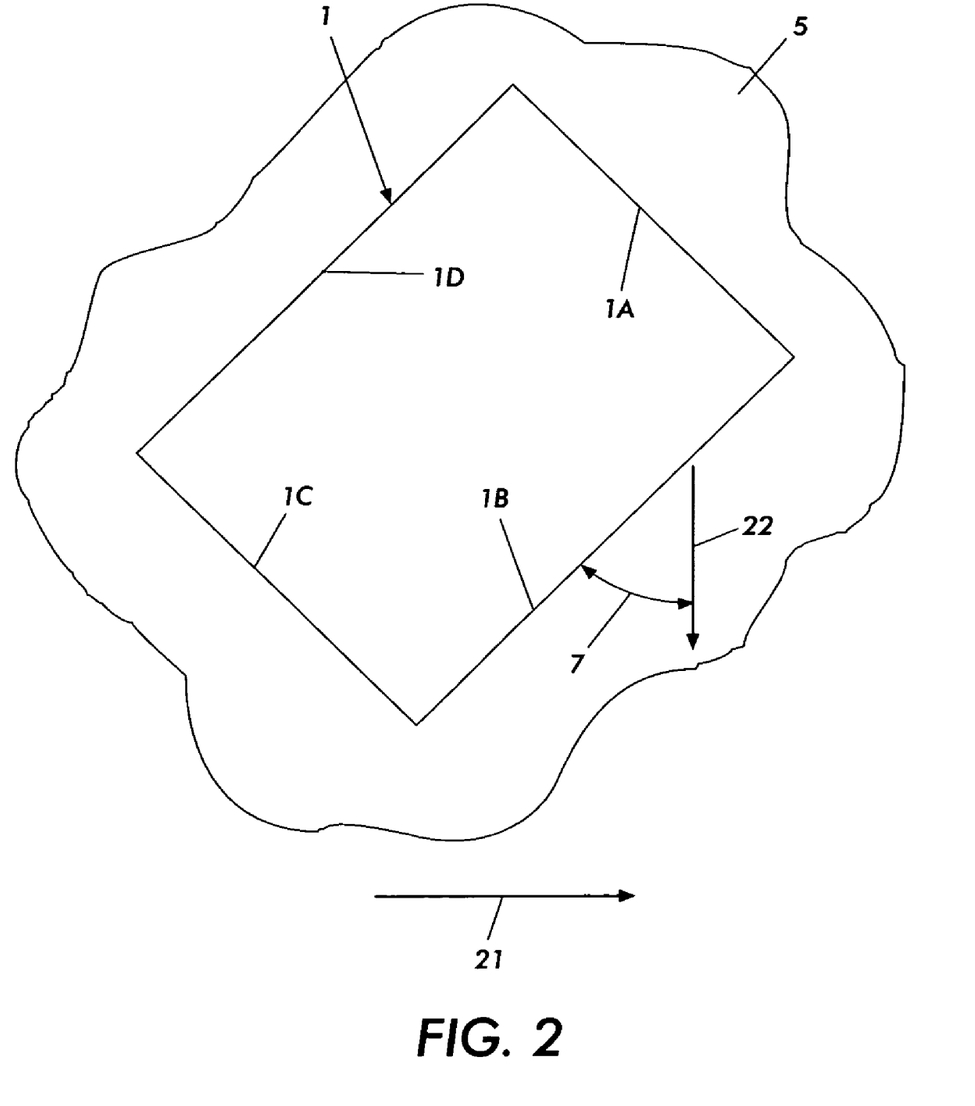
FIG. 2 is a birds-eye view of the FIG. 1 media 1 and backing 5 based on the FIG. 1 reference line designated 2–2'. In connection with the device 100 scanning the media 1 and the backing 5.

Referring now to FIG. 2, there is shown a birds-eye view of the media 1 as positioned against the backing 5. Also shown is the scanning fastscan direction 21 and the slowscan direction 22. The media 1 comprises four (4) edges 1A, 1B, 1C and 1D. As depicted, the media 1 is misaligned or skewed with respect to the scanning fastscan direction 21 and slowscan direction 22. The media edge 1B defines a skew angle or media skew 7 with respect to the slowscan direction 22.

Figure 3:
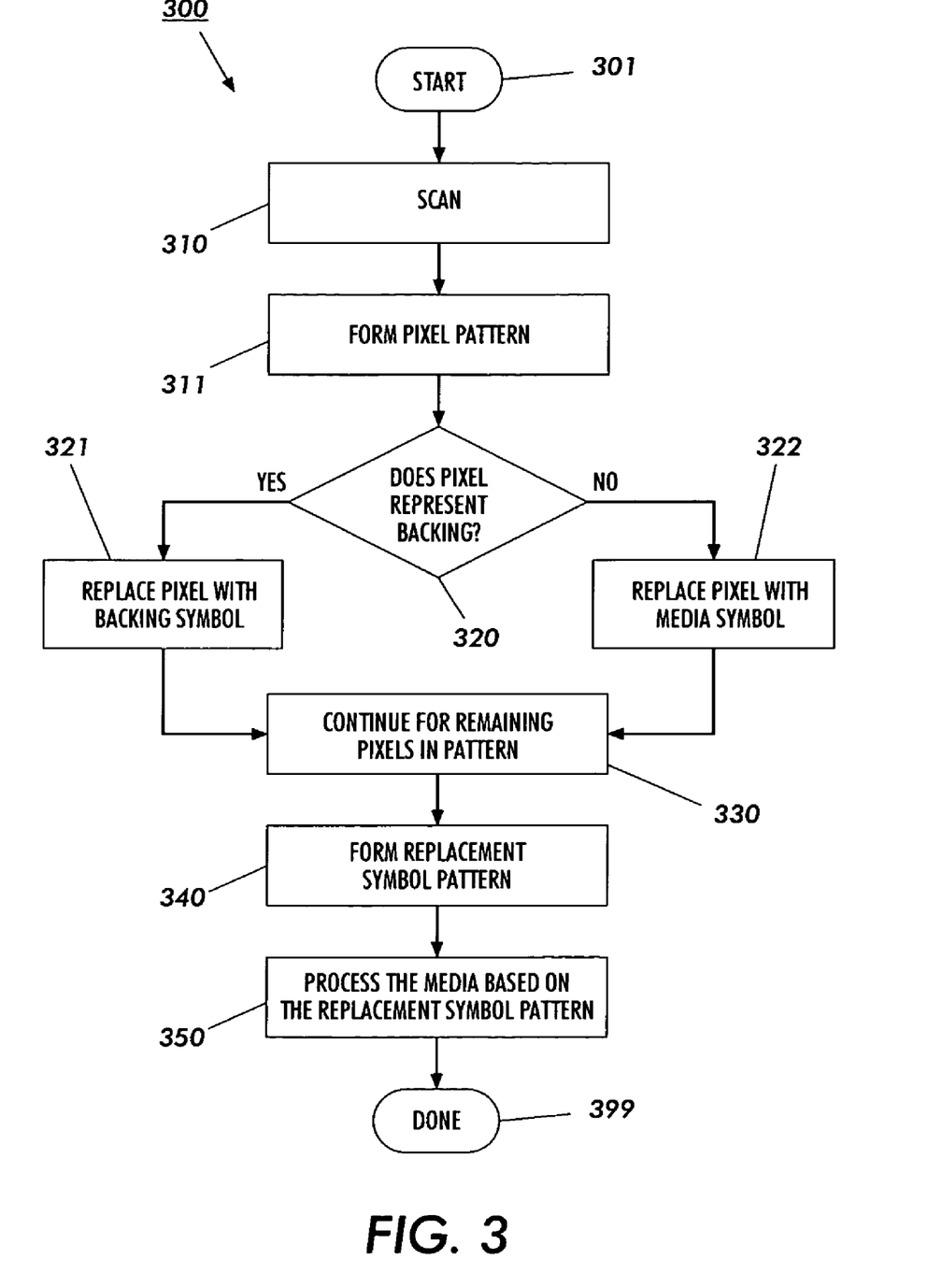
FIG. 3 is a flow diagram of a first embodiment 300 of a method for the FIG. 1 image forming device 100 to process the media 1.

Referring now to FIG. 3, there is a flow diagram depicting the method or process, generally depicted by the reference number 300, for the image forming device 100, to process the media 1.

The process starts, step 301, and then goes to step 310.

In step 310, the media 1 and the backing 5 are scanned to form an image information 8. The process then goes to step 311.

In step 311, based on the image information 8, a pixel pattern is formed. It will be understood that the pixel pattern comprises a plurality of individual pixels. The process then goes to step 320.

In step 320, based on the pattern recognition algorithm 11, for each pixel in the pixel pattern, the process determines when the pixel represents the backing 5.

When the step 320 result is positive ("yes"), that is, when the pattern recognition algorithm 11 determines that the pixel represents the backing 5, the process goes to step 321.

In step 321, the pixel is replaced with a replacement backing symbol. The process then goes to step 330.

Returning to step 320, when the step 320 result is negative ("no"), that is, when the pattern recognition algorithm 11 does not determine that the pixel represents the backing 5, the process goes to step 322.

In step 322, the pixel is replaced with a replacement media symbol. The process then goes to step 330.

In step 330, the foregoing steps 320, 321 and 322 are repeated for the remaining pixels in the pixel pattern. The process then goes to step 340.

In step 340, based on the replacement backing symbols generated in step 322 and further based on the replacement media symbols generated in step 323, the process forms a replacement symbol pattern. The process then goes to step 350.

In step 350, the media 1 is processed based on the replacement symbol pattern.

In one embodiment, the image forming device 100 comprises the skew detection algorithm 12, and the media processing step 350 includes detecting the media skew 7.

In another embodiment, the image forming device 100 comprises the media registering algorithm 13, and the media processing step 350 includes registering the media 1.

In still another embodiment, the image forming device 100 comprises the skew detection algorithm 12 and the media registering algorithm 13, and the media processing step 350 includes detecting the media skew 7 and registering the media 1.

The process then ends, step 399.

In one embodiment, the replacement backing symbol generated in step 321 is a dark gray value that is substantially less than the value of the replacement media symbol generated in step 322.

In another embodiment, the replacement backing symbol generated in step 321 is a gray value of about 0.

In still another embodiment, the replacement backing symbol generated in step 321 is a gray value that is outside the range of allowable gray values for the replacement media symbol generated in step 322.

In one embodiment, the replacement media symbol generated in step 322 is a light gray value that is substantially greater than the value of the replacement backing symbol generated in step 321.

In another embodiment, the replacement media symbol generated in step 322 is a gray value of about 255.

In still another embodiment, the replacement media symbol generated in step 322 is a gray value that is outside the range of allowable gray values for the replacement backing symbol generated in step 323.

Thus, there is described, in an image forming device 100 including a backing 5 with an embedded backing pattern 6, the image forming device 100 arranged for a media 1 to be positioned against the backing 5 and for scanning the media 1 and the backing 5, the media 1 skewed with respect to the scanning thus defining a media skew 7, the image forming device 100 further including a pattern recognition algorithm 11, a method 300 as depicted in FIG. 3 of processing the media comprising steps of:

(a) scan the media and the backing to form an image information (step 310);
(b) based on the image information, form a pixel pattern (step 311);
(c) based on the pattern recognition algorithm, for each pixel in the pixel pattern, determine when the pixel represents the backing (step 320);
(d) when the pattern recognition algorithm determines that the pixel represents the backing, replace the pixel with a replacement backing symbol (steps 320 and 321), otherwise replace the pixel with a replacement media symbol (steps 320 and 322);
(e) based on the replacement backing symbols and the replacement media symbols, form a replacement symbol pattern (steps 330 and 340); and
(f) process the media based on the replacement symbol pattern (step 350).

There also is described an image forming device 100 including a backing 5 with an embedded backing pattern 6, the image forming device 100 arranged for a media 1 to be positioned against the backing 5 and for scanning the media 1 and the backing 5, the media 1 skewed with respect to the scanning thus defining a media skew 7, the image forming device 100 further including a pattern recognition algorithm 11, the image forming device 100 arranged for processing the media in accordance with a method 300 as depicted in FIG. 300 comprising steps of:

(a) scan the media and the backing to form an image information (step 310);
(b) based on the image information, form a pixel pattern (step 311);
(c) based on the pattern recognition algorithm, for each pixel in the pixel pattern, determine when the pixel represents the backing (step 320);
(d) when the pattern recognition algorithm determines that the pixel represents the backing, replace the pixel with a replacement backing symbol (steps 320 and 321), otherwise replace the pixel with a replacement media symbol (steps 320 and 322);
(e) based on the replacement backing symbols and the replacement media symbols, form a replacement symbol pattern (steps 330 and 340); and
(f) process the media based on the replacement symbol pattern (step 350).

In summary, this invention uses the information provided by the scanner backing detection algorithm 11 to process the media 1, the processing including detecting the media skew 7, registering the media 1, or both.

The scanner backing classification is converted to a replacement symbol pattern or "pseudo image" which is applied to at least one of a skew detection algorithm and a media registering algorithm. The results are then combined with the results found by applying the algorithm to the original data. The combination process improves the detection accuracy while also providing an improved confidence level associated with the determined media skew, media registration, or both.

The present invention uses an existing backing detection algorithm in the registration and skew detection. The scanner backing algorithms are currently used for document hole removal (e.g., 3-hole punch), or for the removal of media irregularities or artifacts (such as "dog ear" documents).

In general, the scanner backing detection determines if a given pixel is part of the scanner backing or not. If not, it must be part of the media between the scanner and the backing. The detection of the scanner backing is not sensitive to the content of the document and therefore does not lead to the failure modes associated with dark-edged documents. In general, the scanner backing detection algorithm can be thought of as a classifier, in that either a given pixel is in the "backing" class, or else in the "media" class. A pseudo image is then created from the classification map where, in one embodiment, a gray value of 0 is assigned to "backing" and a gray value of 255 is assigned to "media". The resulting pseudo image is then applied to an existing skew detection algorithm, an existing media registering algorithm, or both.

The advantage of this invention is that the scanner backing detection method of registration can be used with any page-based skew detection, media registration detection, or both, since its only function is to create a pseudo image to be used as an input to one or more existing algorithms.

Figure 4:
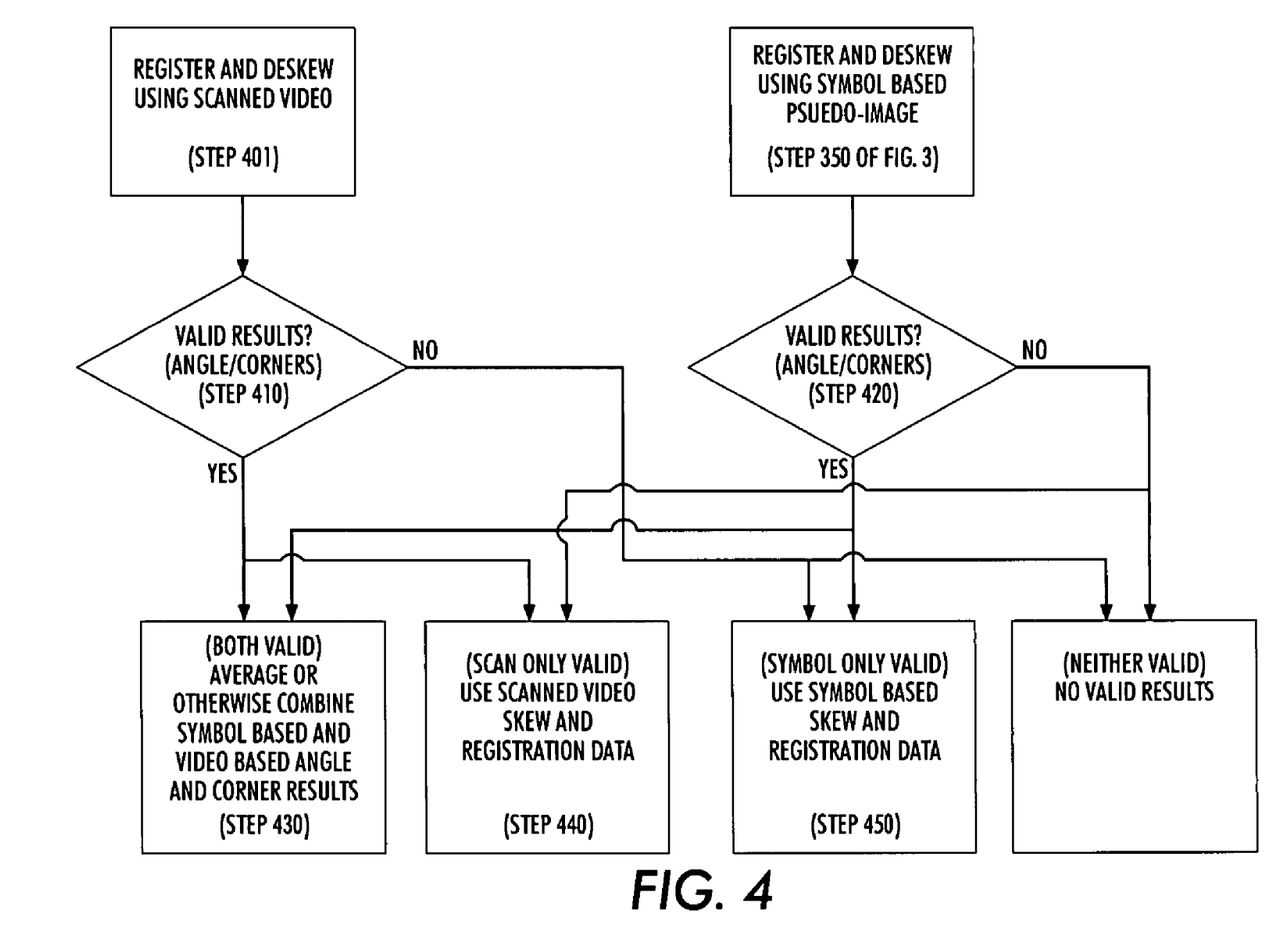
FIG. 4 is a flow diagram of a second embodiment 400 of a method for the FIG. 1 image forming device 100 to process the media 1.

As illustrated in FIG. 4, in one embodiment, for even greater functionality, the scanner backing detection algorithm 300 is used as an "assist" of any page-based skew detection, registration detection, or both. In this embodiment, generally illustrated in FIG. 3 and FIG. 4, the original video and the scanner backing detection generated pseudo image are each fed into independent instantiations of any desired registration detection algorithm, skew detection algorithm, or both. The two independent sets of results (skew angle and corner locations) are then merged. In cases where the two sets of data report similar skew and corner replacement, high confidence that the detection was accurate is achieved. Alternately, if the two sets of data provide differing results, then there is low confidence in the results and a possibility of failure. Finally, there may be instances where only one of the two sets of data even report an angle (the other set may possibly report no edge found, for example). In that case, the result of the other set of data could be used, but confidence in the accuracy of the result could be questionable.

In accordance with this embodiment depicted in FIGS. 3–4, there is further described an image forming device 100 including a backing 5 with an embedded backing pattern 6, the image forming device arranged for a media 1 to be positioned against the backing 5 and for scanning the media 1 and the backing 6, the media 1 skewed with respect to the scanning thus defining a media skew 7, the image forming device 100 further including a pattern recognition algorithm 11, a skew detection algorithm 12 and a media registering algorithm 13, the image forming device 100 arranged for processing the media 1 in accordance with a method comprising steps of:

(a) scan the media and the backing to form an image information (FIG. 3 step 310);

(b) based on the image information, form a pixel pattern (FIG. 3 step 311);

(c) based on the pattern recognition algorithm, for each pixel in the pixel pattern, determine when the pixel represents the backing (FIG. 3 step 320);

(d) when the pattern recognition algorithm determines that the pixel represents the backing, replace the pixel with a replacement backing symbol (FIG. 3 steps 320 and 321), otherwise replace the pixel with a replacement media symbol (FIG. 3 steps 320 and 322);

(e) based on the replacement backing symbols and the replacement media symbols, form a replacement symbol pattern (FIG. 3 steps 330 and 340);

(f) process the media based on the replacement symbol pattern to form a symbol-based registration and deskew result (step 350 of FIG. 3) and determine when the symbol-based registration and deskew result is valid (step 420 of FIG. 4);

(g) process the media based on the video gray level of the scanned image to form a video-based registration and deskew result (step 401 of FIG. 4) and determine when the video-based registration and deskew result is valid (step 410 of FIG. 4);

(h) if only the symbol-based registration and deskew result is valid, use only the symbol-based registration and deskew result (step 450 of FIG. 4);

(i) if only the video-based registration and deskew result is valid, use only the video-based registration and deskew result (step 440 of FIG. 4); and (j) if the symbol-based registration and deskew result is valid and the video-based registration and deskew result is valid, average or otherwise combine both the symbol-based registration and deskew result and the video-based registration and deskew result (step 430 of FIG. 4).

Moreover, the scanner backing detection algorithm can be used to create a pseudo image that can be used with any page skew detection algorithm, page registration detection algorithm, or both. This can eliminate many of the failure modes associated with video-only page skew detection method, page registration method, or both. Additionally, having 2 sets of data (video and scanner backing classification map) to run any page skew detection, page registration detection, or both, can also provide use with a confidence level depending on whether the output results of the two sets are in agreement or are significantly different.

While various embodiments of a method for an image forming device to process a media, and an image forming device arranged in accordance with the same method, in accordance with the present invention, have been described hereinabove, the scope of the invention is defined by the following claims.

What is claimed is:

1. In an image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, a method of processing the media comprising steps of:

(a) scan the media and the backing to form an image information;

(b) based on the image information, form a pixel pattern;

(c) based on the pattern recognition algorithm, for each pixel in the pixel pattern, determine when the pixel represents the backing;

(d) when the pattern recognition algorithm determines that the pixel represents the backing, replace the pixel with a replacement backing symbol, otherwise replace the pixel with a replacement media symbol;

(e) based on the replacement backing symbols and the replacement media symbols, form a replacement symbol pattern; and (f) process the media based on the replacement symbol pattern.

2. The method of claim 1, the image forming device comprising a skew detection algorithm, the media processing step including detecting the media skew.

3. The method of claim 1, the image forming device comprising a media registering algorithm, the media processing step including registering the media.

4. The method of claim 1 wherein the replacement backing symbol is a dark gray value that is substantially less than the value of the replacement media symbol.

5. The method of claim 1 wherein the replacement backing symbol is a gray value of about 0.

6. The method of claim 1 wherein the replacement backing symbol is a gray value that is outside the range of allowable gray values for the replacement media symbol.

7. The method of claim 1 wherein the replacement media symbol is a light gray value that is substantially greater than the value of the replacement backing symbol.

8. The method of claim 1 wherein the replacement media symbol is a gray value of about 255.

9. The method of claim 1 wherein the replacement media symbol is a gray value that is outside the range of allowable gray values for the replacement backing symbol.

10. The method of claim 1 wherein the media comprises a conventional sheet of paper.

11. An image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, the image forming device arranged for processing the media in accordance with a method comprising steps of:
  (a) scan the media and the backing to form an image information;
  (b) based on the image information, form a pixel pattern;
  (c) based on the pattern recognition algorithm, for each pixel in the pixel pattern, determine when the pixel represents the backing;
  (d) when the pattern recognition algorithm determines that the pixel represents the backing, replace the pixel with a replacement backing symbol, otherwise replace the pixel with a replacement media symbol;
  (e) based on the replacement backing symbols and the replacement media symbols, form a replacement symbol pattern; and
  (f) process the media based on the replacement symbol pattern.

12. The image forming device of claim 11 further comprising a skew detection algorithm, the media processing step including detecting the media skew.

13. The image forming device of claim 11 further comprising a media registering algorithm, the media processing step including registering the media.

14. The image forming device of claim 11 wherein the replacement backing symbol is a dark gray value that is substantially less than the value of the replacement media symbol.

15. The image forming device of claim 11 wherein the replacement backing symbol is a gray value of about 0.

16. The image forming device of claim 11 wherein the replacement backing symbol is a gray value that is outside the range of allowable gray values for the replacement media symbol.

17. The image forming device of claim 11 wherein the replacement media symbol is a light gray value that is substantially greater than the value of the replacement backing symbol.

18. The image forming device of claim 11 wherein the replacement media symbol is a gray value of about 255.

19. The image forming device of claim 11 wherein the replacement media symbol is a gray value that is outside the range of allowable gray values for the replacement backing symbol.

20. The image forming device of claim 11 wherein the media comprises a conventional sheet of paper.

21. The image forming device of claim 11 further arranged to perform at least one of a copying function, a printing function and a faxing function.

22. An image forming device including a backing with an embedded backing pattern, the image forming device arranged for a media to be positioned against the backing and for scanning the media and the backing, the media skewed with respect to the scanning thus defining a media skew, the image forming device further including a pattern recognition algorithm, a skew detection algorithm and a media registering algorithm, the image forming device arranged for processing the media in accordance with a method comprising steps of:
  (a) scan the media and the backing to form an image information;
  (b) based on the image information, form a pixel pattern;
  (c) based on the pattern recognition algorithm, for each pixel in the pixel pattern, determine when the pixel represents the backing;
  (d) when the pattern recognition algorithm determines that the pixel represents the backing, replace the pixel with a replacement backing symbol, otherwise replace the pixel with a replacement media symbol;
  (e) based on the replacement backing symbols and the replacement media symbols, form a replacement symbol pattern;
  (f) process the media based on the replacement symbol pattern to form a symbol-based registration and deskew result and determine when the symbol-based registration and deskew result is valid;
  (g) process the media based on the video gray level of the scanned image to form a video-based registration and deskew result and determine when the video-based registration and deskew result is valid;
  (h) if only the symbol-based registration and deskew result is valid, use only the symbol-based registration and deskew result;
  (i) if only the video-based registration and deskew result is valid, use only the video-based registration and deskew result; and
  (j) if the symbol-based registration and deskew result is valid and the video-based registration and deskew result is valid, average or otherwise combine both the symbol-based registration and deskew result and the video-based registration and deskew result.

23. The image forming device of claim 22 wherein the replacement backing symbol is a dark gray value that is substantially less than the value of the replacement media symbol.

24. The image forming device of claim 22 wherein the replacement backing symbol is a gray value of about 0.

25. The image forming device of claim 22 wherein the replacement backing symbol is a gray value that is outside the range of allowable gray values for the replacement media symbol.

26. The image forming device of claim 22 wherein the replacement media symbol is a light gray value that is substantially greater than the value of the replacement backing symbol.

27. The image forming device of claim 22 wherein the replacement media symbol is a gray value of about 255.

28. The image forming device of claim 22 wherein the replacement media symbol is a gray value that is outside the range of allowable gray values for the replacement backing symbol.

29. The image forming device of claim 22 wherein the media comprises a conventional sheet of paper.

30. The image forming device of claim 22 further arranged to perform at least one of a copying function, a printing function and a faxing function.

* * * * *